Feb. 10, 1959  C. L. GAHAGAN  2,872,987
FLEXIBLE AIRFOIL
Filed May 22, 1953  2 Sheets-Sheet 2

INVENTOR.
CHARLES L. GAHAGAN.
BY
ATTORNEYS.

United States Patent Office 2,872,987
Patented Feb. 10, 1959

2,872,987
FLEXIBLE AIRFOIL

Charles Lester Gahagan, Greensburg, Pa.

Application May 22, 1953, Serial No. 356,827

4 Claims. (Cl. 170—159)

This invention is for an airfoil used as the wing or blade of the rotor of a helicopter, or which may be used for fixed wing flying machines.

While my invention is adapted for use on various types of heavier-than-air flying machines, it is especially designed for use as a rotor blade for helicopters and similar revolving wing craft, and it will be in this connection that it is hereinafter more fully described, but, however, without intending to exclude other purposes for which it is adapted.

As is well understood in the art, the rotor blades or wings on the revolving head of a helicopter are supported by hubs which change the inclination or angle of attack of the airfoil as the blade rotates, being at a lesser angle as the blade comes forward, or "upwind," and at a greater angle as the blade moves rearwardly or "downwing." In addition, blades are commonly attached to the hub on a hinge or pivot so as to hinge up or down in flight, or they are made flexible to bend to some extent in flight. Generally stated, centrifugal force tends to straighten the blade, and lift tends to swing or bend it up, and the wing is designed with these factors in mind. Additionally de-icing equipment is generally provided on the wings where weather conditions so require. Wing structures heretofore provided for the purpose are therefore expensive, fragile and difficult to repair if damaged by contact with some object.

My invention has for its principal object to provide an improved wing structure which can be cheaply manufactured, easily repaired, which is deformable in flight either to "spill" the air or to dislodge ice formation, and which can be rigidly secured to the rotor hub without hinging.

My invention and the advantages thereof may be more fully understood by reference to the accompanying drawings in which.

Figure 1:
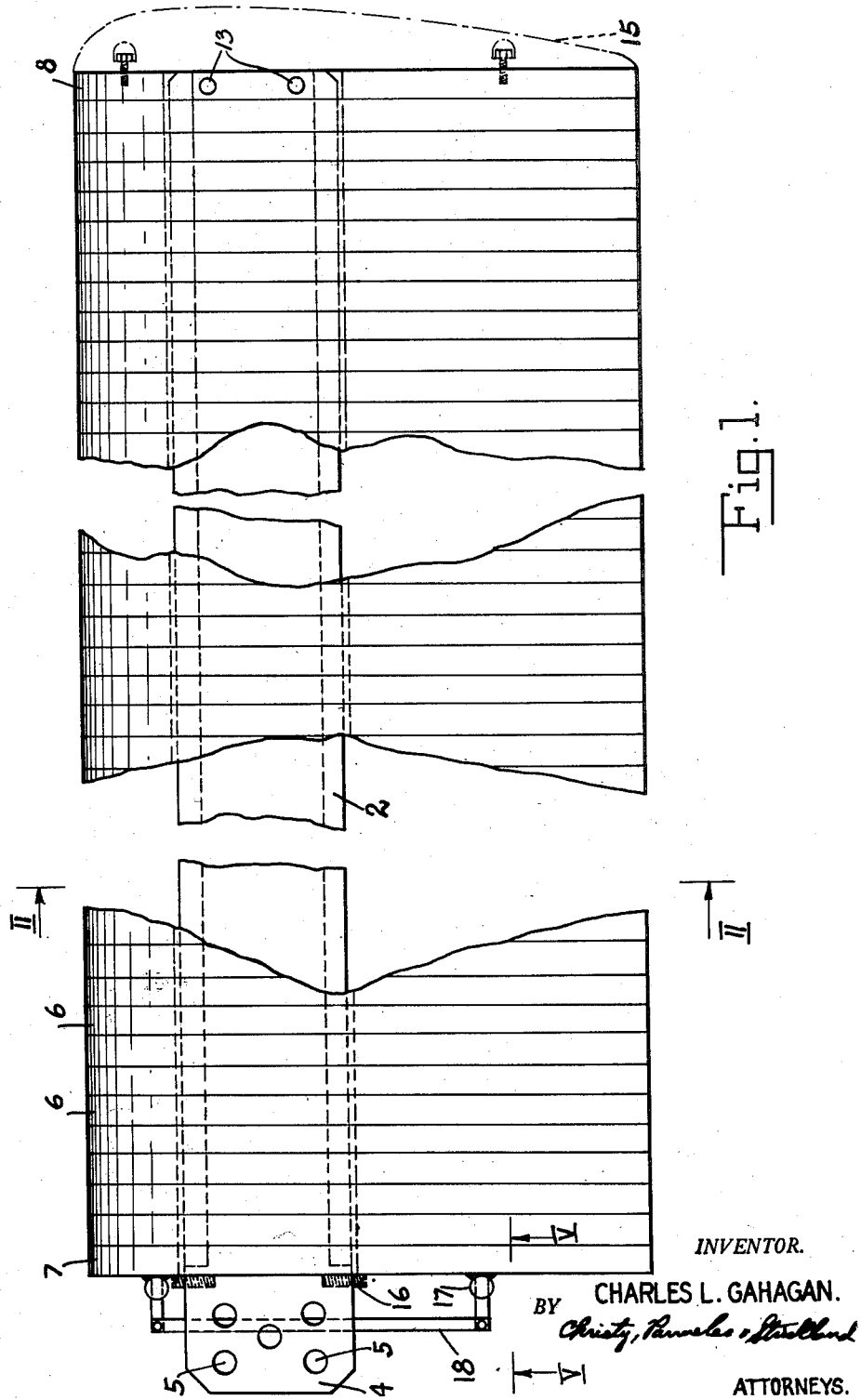
Fig. 1 is a broken plan view of the wing assembly embodying my invention.
Figure 2:
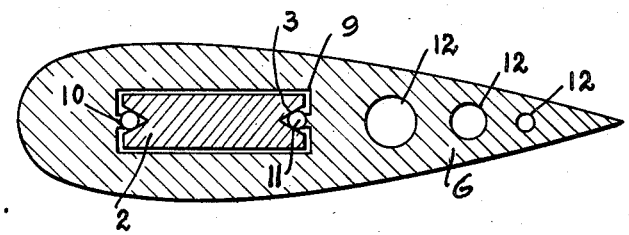
Fig. 2 is a transverse vertical section in the plane of line II—II of Fig. 1.

In the drawings, 2 designates the main spar of the wing. It is of generally rectangular section and may be solid or hollow, but its width horizontally is greater than its thickness. Stainless steel is preferably used because of its physical and nonrusting properties. Because of the rectangular shape of the spar, it resists deflection in a horizontal direction but is more readily deflected in a vertical direction and hence will have adequate flexibility in this direction without hinging the spar to the hub. The side edges of the spar each have a groove 3 extending from the outer end almost to the opposite end, preferably, though not necessarily, terminating at the inner terminal portion 4 which has holes 5 therethrough to enable it to be bolted to the hub of the rotor or other body.

Figures 3, 4:
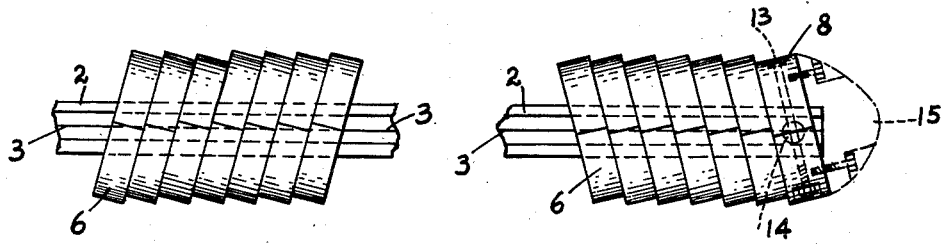
Fig. 3 is a fragmentary rear view of the wing with the sections tilted.
Fig. 4 is a similar fragmentary view of the rear of the wing adjacent the tip.
Figure 5:
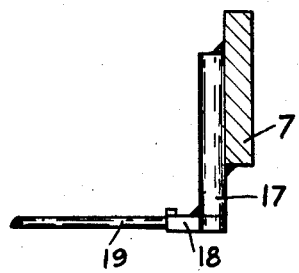
Fig. 5 is a detail of the innermost section, the view being a rear elevation.

The airfoil is comprised of a series of similar metal or plastic sections 6 which are slid onto the spar from the outer end, with a special inner section 7 and a special outer section 8. Each section 6 is contoured as shown with a rounded leading edge and a tapered trailing edge to provide the desired airfoil shape, and it has flat side faces so that each will lie flush against the next. Each is provided with a rectangular opening 9 slightly larger than the spar. Preferably each vertical side of the opening 9 has a half-round socket 10 formed therein to provide a seat for a steel ball 11, the projecting surfaces of the balls being received in the grooves 3, which are preferably V-shaped. The two balls serve to position the sections on the spar, enable them to be freely moved therealong, and provide pivots so that they may turn slightly from a vertical position to a sloped position as shown in Figs. 3 and 4. The sections, however, are restrained from tilting on the spar in a fore-and-aft direction by this type of mounting. The sections themselves may be solid aluminum, magnesium or plastic, and may have one or more openings 12 therethrough to lighten them, or they may be formed as hollow objects. In a typical helicopter wing, they have an overall length of about ten to twelve inches, so that individually they are quite light.

The outermost section 8 is held against sliding by bolts 13 passing therethrough and through the spar. This section may, if desired, be either of stronger material or wider than the intermediate sections, and the bolts 13 may pass through balls 14 that are mounted in the spar so as to provide for the tiltable movement of the end piece. Since the end piece must resist the centrifugal force acting on all of the sections, it may be made a little wider than the other sections to accommodate large bolts 13, but it will be apparent that other abutment means may be used to resist centrifugal action. In addition, the end section may have attached to it an end piece 15 which is faired and rounded to give a finished appearance to the wing tip.

The inner piece 7 may be positioned or held by any suitable abutment on the terminal of the spar. This may be accomplished by not having the grooves 3 extend the entire length of the spar, or by the use of bolts 16 screwed into opposite side edges of the spar. This section has two depending straps 17 secured rigidly to its inner face, and these straps in turn are connected by a cross strap 18 to which an operating rod 19 is attached. Provision can be made on the hub for either manual or cyclical operation of the rod to raise it or lower it from a neutral position and thereby rock all of the wing sections in the manner shown in Figs. 3 and 4. Manual rocking, if used alone, would normally be for de-icing or special maneuvering, whereas cyclical operation might be used to decrease the lift of the wing on the upwind travel and in effect "spill" the air, thereby accomplishing a result similar to that obtained by horizontally hinging a conventional rotor blade. This is because the uniform contour of the wing is broken when the sections are tilted out of vertical, causing a channeling of the air passing over the wing surface into the valleys formed between adjacent sections when tilted where the thickness of the wing is reduced and therefore the lift decreased. Moreover, the overall average thickness of the wing may be decreased to decrease the lift by this tilting of the sections. It also has other possible advantages of an aerodynamic character which I have not yet been able to establish. Since the sections are substantially symmetrical about their tilting axes, centrifugal forces acting on the sections when they are being tilted or restored to upright positions are substantially balanced, so that little effort is required to effect this action.

Figure 6:
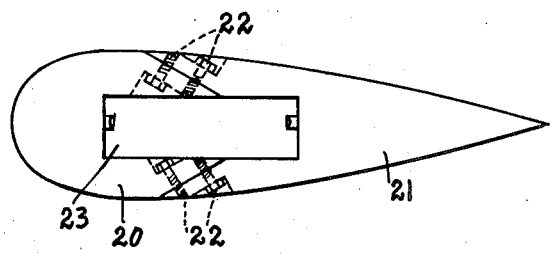
Fig. 6 is a side elevation of a repair section.

If the blade is damaged, as in military operations, or by contact with some object, the end piece can be removed, the sections slid off onto a piece of board shaped like the spar, the defective sections removed, and a new section quickly replaced, or a broken section may be cut out and simply replaced by a repair section, such as shown in Fig. 6. In this view the section is made of two parts 20 and 21, which are shaped to provide overlapping mating parts, and bolts 22 secure them together. The separation of the two sections is of course such that the joining edges lead to the spar receiving opening 23, so that the two parts of the section can be fitted into place about the spar.

While I have illustrated one embodiment of my invention, it will be understood that this is to be taken as illustrative, and that various changes and modifications may be made therein.

I claim:

1. An airfoil comprising a spar, the width of which in a horizontal direction exceeds its vertical thickness whereby it is more flexible in a vertical direction than in a horizontal direction, a series of individual narrow parallel foil sections arranged in face-to-face relation along the length of the spar, each section having a transverse opening therethrough of substantially the same contour as the spar through which the spar passes, said sections constituting a single airfoil surface in which relative vertical motion of the sections may take place with the flexing of the spar in a vertical direction, means at the outer end of the spar for retaining the sections on the spar, the openings through the sections providing sufficient clearance around the spar to permit tilting of each section in a direction transverse to the fore-and-aft length of the section, and means at the inner end of the spar for effecting such tilting motion of the sections.

2. An airfoil as defined in claim 1 in which the spar is of rectangular shape with a longitudinally extending groove in the front and rear face of the spar, the openings in the sections being also rectangular and slightly larger than the spar, and means on the walls of the openings in the sections projecting into grooves of the spar providing a pivoted mounting for the section along their fore-and-aft axes, whereby the sections may have a transverse tilting motion on the spar.

3. An airfoil as defined in claim 2 in which said means on the walls of the openings projecting into the grooves are balls.

4. An airfoil as defined in claim 2 in which the means at the outer end of the section for retaining the series of sections on the spar is also a section of similar contour having bolts therethrough passing through the ends of the spar in such manner that said last-named section may tilt with the other sections.

References Cited in the file of this patent

UNITED STATES PATENTS

| | | |
|---|---|---|
| 1,044,064 | Lorenzen | Nov. 12, 1912 |
| 1,789,240 | Leitner | Jan. 13, 1931 |
| 1,827,281 | Carns | Oct. 13, 1931 |
| 2,254,821 | Haw | Sept. 2, 1941 |

FOREIGN PATENTS

| | | |
|---|---|---|
| 469,086 | Great Britain | July 19, 1937 |
| 671,417 | Great Britain | May 7, 1952 |